No. 629,844. Patented Aug. 1, 1899.
H. H. BRIDGWATER.
MACHINE FOR MOLDING GLASSWARE.
(Application filed Dec. 16, 1898.)
(No Model.) 2 Sheets—Sheet 1.
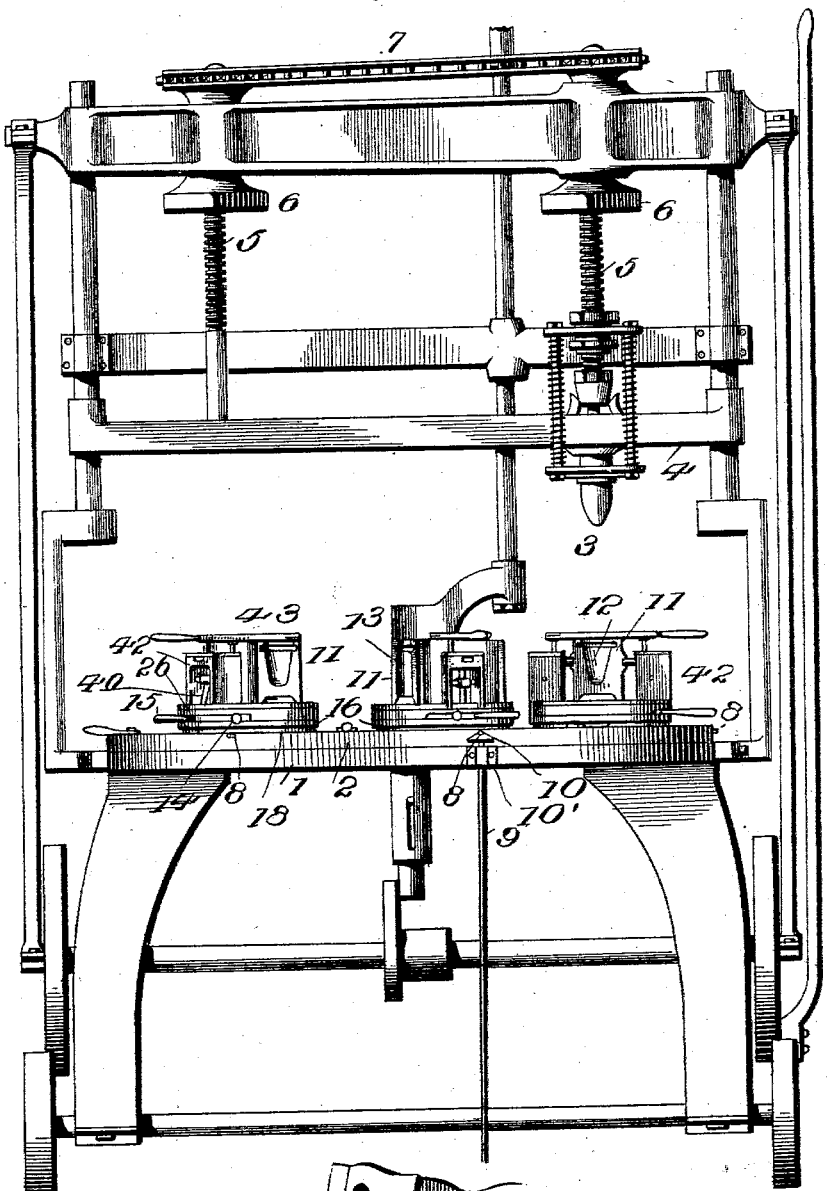
Witnesses
Jno Imrie
D. W. Gould.
Inventor
H. H. Bridgwater,
by Benj. R. Catlin
Attorney
THE NORRIS PETERS CO., PHOTO-LITHO., WASHINGTON, D. C.

No. 629,844. Patented Aug. 1, 1899.
H. H. BRIDGWATER.
MACHINE FOR MOLDING GLASSWARE.
(Application filed Dec. 16, 1898.)
(No Model.) 2 Sheets—Sheet 2.
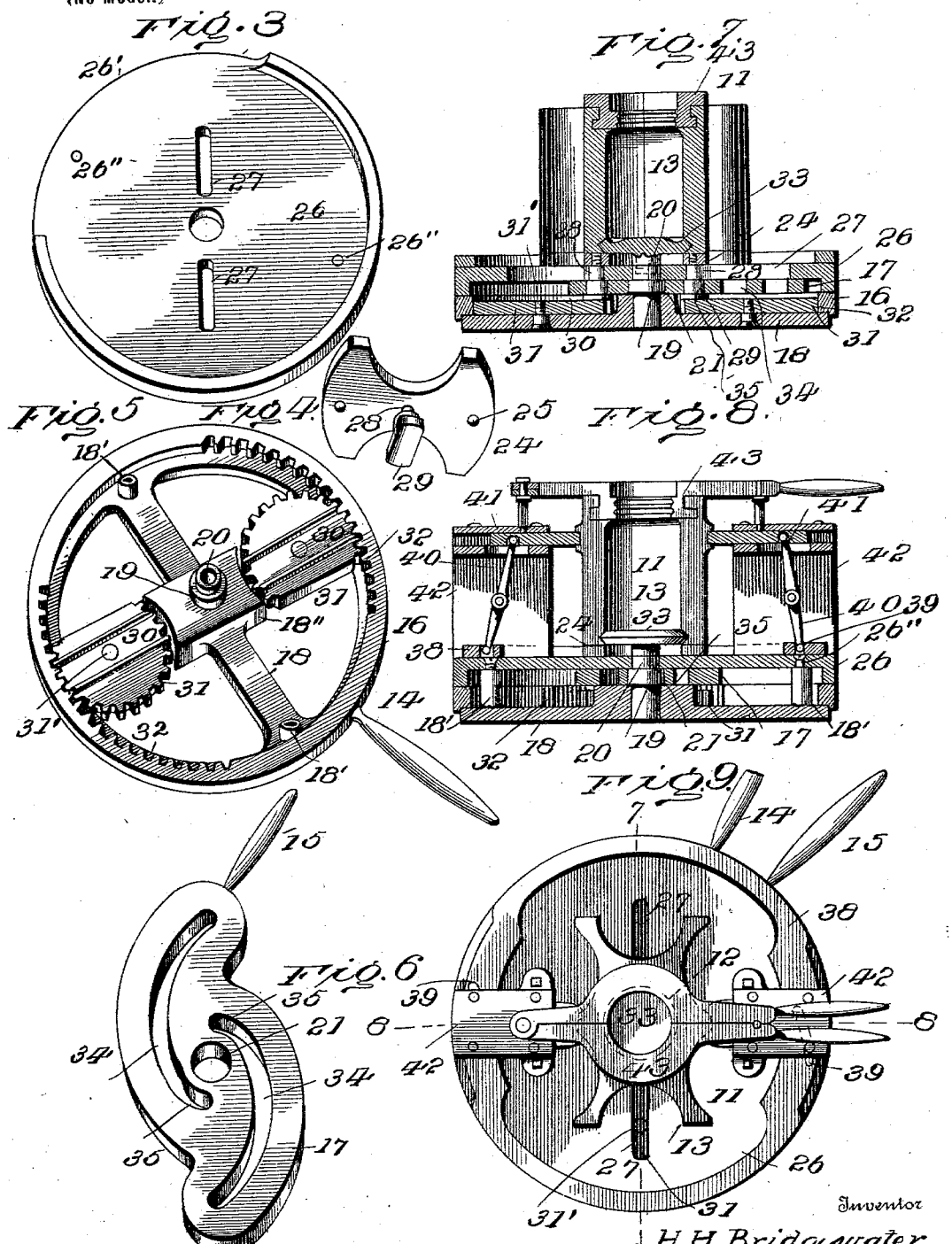

UNITED STATES PATENT OFFICE.

HARRY H. BRIDGWATER, OF AKRON, OHIO, ASSIGNOR TO CLEMENT W. SHOEMAKER, OF BRIDGETON, NEW JERSEY.

MACHINE FOR MOLDING GLASSWARE.

SPECIFICATION forming part of Letters Patent No. 629,844, dated August 1, 1899.

Application filed December 16, 1898. Serial No. 699,514. (No model.)

*To all whom it may concern:*

Be it known that I, HARRY H. BRIDGWATER, a resident of Akron, in the county of Summit and State of Ohio, have invented certain new and useful Improvements in Machines for Molding Glassware; and I do hereby declare the following to be a full, clear, and exact description of the invention, such as will enable others skilled in the art to which it pertains to make and use the same.

The invention relates to machines for forming jars and other glassware and to that class which employ disconnected mold-sections for successively forming press and blow molds and a rotating device for suitably moving the sections to and from a mold-bottom; and it has for its object to improve the mold-section-moving devices and other parts.

The invention consists in the construction hereinafter described and pointed out.

In the accompanying drawings, Figure 1 is an elevation of the machine. Fig. 2 is a partial plan of a lock-operating device provided with a cam-groove. Fig. 3 is a perspective looking at the bottom of a mold-section guide-plate. Fig. 4 is a perspective of a mold-section carriage. Fig. 5 is a perspective of a mold-section-moving gear-ring and supporting-ring carriage-gears. Fig. 6 is a perspective of a cam-plate for moving the mold-section carriages. Fig. 7 is a section on line 7 7 of Fig. 9. Fig. 8 is a section on line 8 8 of Fig. 9; and Fig. 9 is a plan of neck, body, and bottom mold and related parts disposed as when a press-mold is formed.

Numeral 1 denotes a table, and 2 a supplemental top which is made rotatable to carry the molds around step by step as required by the different operations, such as charging, pressing, and expanding. These parts are well known and need no particular description.

3 denotes a presser supported in a suitable frame having an adjustable bar 4. Bar-adjusting screws are indicated by 5, and 6 denotes adjusting nuts or sleeves which extend through the upper cross-bar of the frame and have sprocket-gears fixed thereto and are connected by a chain 7, whereby the turning of one sleeve or nut 6 rotates the other and moves the bar 4 in a right line, maintaining its exact relation to contiguous parts.

8 denotes stops adjacent each operative situation of the molds, and 9 is a rod which may be suitably interposed to determine the rotary movement of the table-top 2. A keeper or guide for the rod is denoted by 10', and 10 indicates a head for the rod, said head having inclines and a stop-engaging notch at its highest part where the inclines meet.

The mold-sections 11 are made double, as indicated in Fig. 9. Each section comprises a concave face 12, constituting a half of a body press-mold, and also a concave face 13, constituting a half of a finishing or expansion mold. As illustrated in Fig. 9, the sections are arranged with their faces 12 contiguous to form a press-mold, the expansion or blow mold faces 13 being oppositely disposed. The halves of either mold can be put in operative relation by a simultaneous half-rotation of the sections. The forming of different molds by moving the section is effected by the handles 14 and 15, fixed, respectively, to the gear-ring 16 and cam-plate 17.

The ring 16 rests on a circular frame 18, fixed to the supplementary table-top 2, and is rotatable thereon. The cam-plate 17 is supported on the central block 18" of the gear-supporting frame 18 and is rotatable about the hub 19 of said frame. The guide-plate 26 is situated above the cam-plate 17 and is fixed to frame 18 by means of screws passing through holes 26''' in said plate and into tubes 18', fixed to frame 18. The guide-plate has on its under side a supporting-rim, which may be cut away, as at 26', for the passage of the handle 15 of the cam-plate 17.

Each mold-section 11 is fixed to a carriage 24 in any suitable manner, as by screws passing through holes 25 in said carriage. The mold-sections and their carriages are situated above the guide-plate 26, which has guide-slots 27, receiving each a post 28 of a mold-section carriage. Said posts have each a part 29, adapted to slide in the ways 30 in gears 31. The guide-plate 26 is fixed to table-top 2, and 26'' denotes holes for the purpose.

The rotation of the ring 16 rotates the gears 31 by means of the ring-gears 32. The said gears 31 turn about pivots 31', fixed in frame 18.

A suitable rotation of the cam-plate 17 moves the mold-sections to and from the centrally-situated bottom mold 33, said movement being necessarily radial, because of the radial slots 27 in the fixed guide-plate.

The cam-plate has two grooves, each comprising a main part 34, adapted to act upon a post 28 of a mold-section carriage 24 and, in combination with a fixed guide 27, move said carriage radially, the rotation of each carriage being simultaneously effected by the connection of its foot 29 with a gear 31, said connection being such that the foot can slide in way 30, whereby the radial movement of the carriage and mold-section is permitted while said gear-carriage and section rotate with or about a pivot 31'.

The cam-plate grooves each comprise a part 35, which is made concentric with the cam-pivot to permit a small initial inoperative movement of the cam-plate to permit the release of locking devices before the section-moving devices begin to operate.

41 are bars or rods sliding in suitable ways formed in the upper part of housings 42 and adapted to engage the mold-sections and hold them together when moved into an operative situation. The locking-bars are actuated by levers 40, which are turned upon their pivots by cams 39, formed in ring 38. In operation when said ring and the cam-plate are oppositely moved to separate two mold-sections and bring their alternate faces into operative relation, the parts being initially situated as indicated in Fig. 8, for example, the cam-plate will be inoperative while grooves 35 are adjacent the carriage-posts 28, because said grooves are concentric with the plate-pivot. This allows the cams 39 to operate and unlock the mold-sections before the cam-grooves 34 of cam-plate 17 become operative and before they, in connection with other parts, begin to separate and rotate said sections.

43 denote neck-mold sections of usual form, and 44 are handles for rotating the table-top 2.

Having thus described my invention, what I claim as new, and desire to secure by Letters Patent, is—

1. In a machine for molding glass, mold-sections each comprising two oppositely-situated concave faces of different dimensions and devices for successively bringing the similar faces of the sections in operative relation for molding, said sections being separable and movable in right lines.

2. In a machine for molding glass, mold-sections each comprising two oppositely-situated concave faces of different dimensions and devices for successively bringing the similar faces of the sections in operative relation for molding, said sections being separable and movable in right lines, said devices comprising a rotating part mediately connected to the disconnected sections.

3. In a machine for molding glass, mold-sections each having oppositely-situated half-mold faces, a rotating device adapted to separate such sections, and a rotating device adapted to rotate the sections, said devices being independently operable.

4. In a machine for molding glass, mold-sections each having oppositely-situated half-mold faces, a rotating device adapted to separate such sections, and a rotating device adapted to rotate the sections, said devices being independently operable, and guides to give a radial direction to the section-separating movement.

5. In a machine for molding glass, mold-sections each comprising two oppositely-situated concave faces of different dimensions and devices for successively bringing the similar faces of the sections in operative relation for molding, said sections being separable and movable in right lines, said devices comprising rotatable gears, mold-carriages controlled rotatably by the gears and loosely connected therewith to move diametrically of the gears, a rotating plate provided with grooves engaging the carriages, and a plate provided with radial grooves also engaging the carriages, whereby the rotation of the gears and the cam-plate forms successively a press and an expansion mold.

6. In a machine for molding glass, mold-sections having each on opposite sides thereof parts of press and expansion molds, and devices for successively forming the molds by rotating the sections said devices comprising a cam to mediately move the sections, fixed guides to direct the sections radially, and rotatable gears connected to said sections to rotate them, said mold-sections being mediately and loosely connected to the gears between ways to permit the sections to move transversely of the gears while rotating.

7. In a machine for molding glass, separable mold-sections, devices for opening the sections, a lock to hold said sections closed when desired, and a rotating cam-plate having grooves operatively connected to the sections to open them, said grooves having connected portions concentric with the cam-plate pivot to render the cam-plate inoperative during a part of its rotation.

8. In a machine for pressing glass, a presser, a presser-supporting frame comprising an adjustable cross-bar carrying the presser, a plurality of bar-adjusting screws, threaded sleeves rotatably supported in the frame to move the adjusting-screws, and a connection between said sleeves to insure equal simultaneous movement of the sleeves and screws.

In testimony whereof I have signed this specification in the presence of two subscribing witnesses.

HARRY H. BRIDGWATER.

Witnesses:
  C. F. BEERY,
  H. L. SNYDER.